Jan. 24, 1956

R. M. COLMAN 2,731,870

STOP FOR LATHE CARRIAGE

Filed Feb. 18, 1953

United States Patent Office 2,731,870
Patented Jan. 24, 1956

2,731,870

STOP FOR LATHE CARRIAGE

Roderick M. Colman, New York, N. Y.

Application February 18, 1953, Serial No. 337,516

4 Claims. (Cl. 82—21)

This invention relates to stop means for limiting the movement of a sliding member of a machine tool, such as a tool holder, and has special application to determining the limit of operative movement of the carriage for the tool post in a lathe.

An object of the invention is to provide a stop for this purpose which will afford facility and accuracy of adjustment. Another object is to increase the scope of utility of such stops. Other general objects are simplicity and economy in construction and dependability in operation.

The invention contemplates a stationary stop adapted to be secured in selected position to one of the carriage guides and in the path of a part of the carriage such as the apron, which stop comprises fixed and adjustable members that cooperate to determine the position of the apron engaging face.

Preferably the stop includes a holder which can be clamped to a guide at any desired position along the guide, and an elongated member slidable in the holder, with a plurality of adjustable stops disposed around the elongated member so as selectively to engage a fixed stop on the holder, the member being rotatively adjustable to bring the selected adjustable stop into cooperative relation with the fixed stop.

Desirably the adjustable stops will be disposed in longitudinal grooves and can be accurately set along the grooves by means of a depth gauge or micrometer, provision being made to secure such stops in adjusted positions.

Thus there is provided the double adjustment of the holder with respect to the carriage and of the multiple stop member with respect to the holder. Other advantages of the invention will appear from the following description of the embodiment illustrated in the accompanying drawings.

Figure 1:
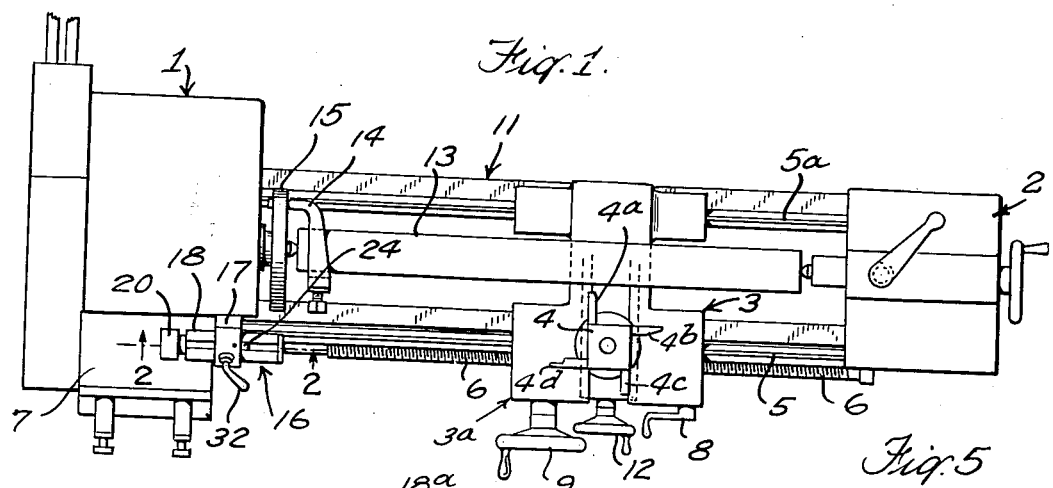
Fig. 1 is a plan of a lathe with an embodiment of the invention applied thereto.

The illustrated lathe is of common construction with a head stock 1, tail stock 2, carriage 3 with cross slide for the tool post 4 on which are mounted a plurality of tools marked 4a, 4b, 4c and 4d. The carriage is mounted to slide on longitudinal V-guides 5 and 5a in the usual way and a lead screw 6 is detachably operatively connected to drive the carriage in one direction or the other in the well known way through quick change gear attachment 7. When the carriage is detached from the lead screw by the operation of crank 8 it is free then to be further manually moved along the slides by the operation of crank 9 which operates a pinion in mesh with a rack 10 on the bed 11. The tool post is cross adjusted by the hand wheel 12, and the work 13 is mounted between the head and tail stocks and for rotation is connected by the dog 14 to the face plate 15 in the well known way.

The stop means which constitutes the subject matter of this invention is an attachment 16 which comprises a fixed holder 17 which is removably clamped to the V-guide 5 and is movable to any position along the length of the guide, and a slidable rod-like member 18 which is adjustably clamped in the holder and constitutes the retainer for a plurality of adjustable guides which are selectively cooperative with a fixed guide on the holder 17.

As shown in the construction of Figs. 1 to 4, the member 18 is a round elongated member which is provided with a plurality (shown as four) lonigtudinal grooves numbered 18a, 18b, 18c and 18d. These grooves are equally spaced around the slidable member and, as shown, they are circular in cross section and are slightly more than a semi-circle so that the grooves are undercut. They extend from the abutment end to a circumferential groove 19, leaving a rounded ungrooved end 20 opposite the abutment end of the member 18.

On the abutment end of the slidable member is a circular disc 21, shown as attached by a screw 22. This disc constitutes the abutting member which is engaged by the apron 3a of the carriage 3 to limit the movement of the carriage. This end disc 21 is provided with holes 23, one in line with each of the grooves. As will appear, this is for the purpose of enabling the use of a depth gauge to set adjustable stops in the grooves.

In each groove is an adjustable stop 24 which stops are variously settable and cooperate selectively with a fixed stop 25 carried by the annular holder 17 and shown in this form as secured at the top by a screw 26 and of a size to enter the grooves and extend into the path of the adjustable stop 24 in its groove. Because of its location it projects into the groove 18a in the illustrated position of the slidable member.

The adjustable stops 24 are shown as rounded to fit into the grooves and having their exposed surface portion curved to the radius of the slidable member 18. To tighten them in set position they are shown as a split longitudinally along a diametrical line substantially to their centers, and wedging means are provided to wedge the two opposing portions apart and thus frictionally lock the members in their set positions in the grooves.

For this purpose the stop 24 is shown as tapped centrally of its long radius surface portion in line with the longitudinal split, the bottom end of the tap being conical. Into this tap is screwed an Allen screw 27 which also has a conical inner end. As the screw is turned down to bring its outer end flush with the exposed surface of the stop 24, it is proportioned to wedge the split portions apart into locking condition.

Figures 3, 6, 7:
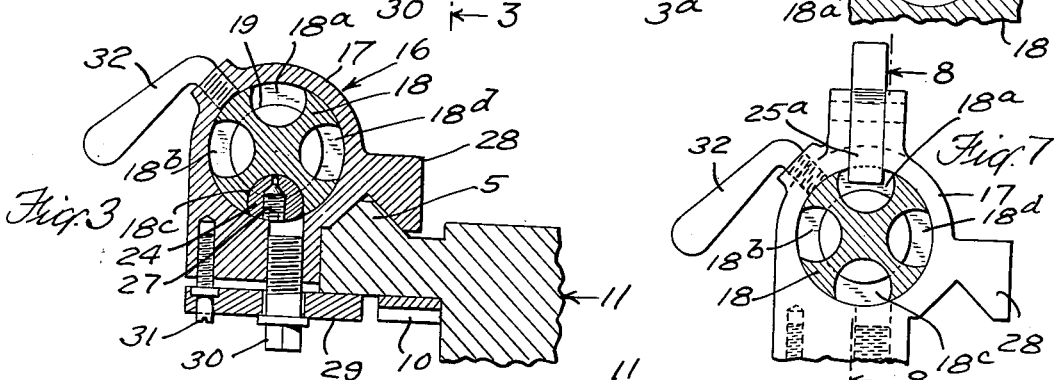
Fig. 3 is a transverse section on the line 3—3 of Fig. 2.
Fig. 6 is an enlarged sectional detail on line 6—6 of Fig. 2.
Fig. 7 is an end elevation of the holder with the slide member in section and showing a modified form of fixed stop.

The holder 17 is shown as secured on to the V-guide 5 by means which clamp the complementary under face of an overhanging arm 28 on to the V-guide, as shown in Fig. 3. For this purpose a clamp plate 29 bears against the underside of the guide and is drawn toward the holder 17 by a screw 30 which passes through the plate and screws into the bottom of the holder. A head on the screw bears on the underside of the plate which is large enough to engage underneath the V-guide. Thus the overhanging arm 28 and the plate 29 are drawn toward each other. A leveling screw 31 serves to obtain proper relative positioning of the holder and plate in well known manner.

Means are provided to lock the holder 17 and the slidable member 24 against relative movement after a setting has been made. This is shown as a manually operable set screw having a handle 32 and a screw portion that screws into a tapped boss on the holder and is adapted when set up to bear with its inner end against the slidable member 18, as shown.

Figures 2, 5:
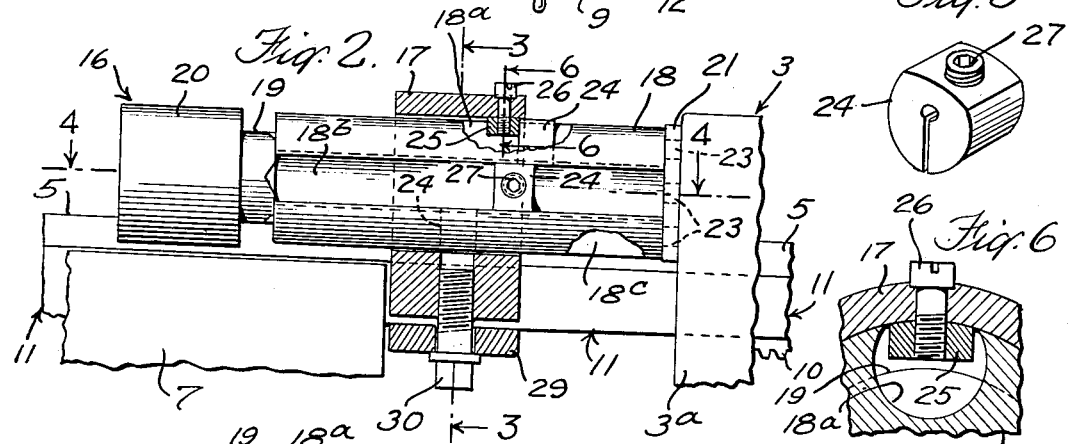
Fig. 2 is a sectional elevation on enlarged scale of the stop means on line 2—2 of Fig. 1.
Fig. 5 is a perspective detail of one of the adjustable stops.

In use the stops 24 will be accurately set in the respective grooves so that when they are cooperative with the fixed stop 25 they will cause the end disc 21 to have the right position to limit the travel of the carriage. For example, the work is shown as being operated upon by the tool 4a and the slide member 18 is angularly positioned to bring groove 18a at the top to receive the fixed stop 25. The stop 24 in that groove has been set to stop the carriage in the right place to limit the work by tool 4a. In other words the member 18 is moved to the left as shown in Fig. 2 until the two stops abut. Then the set screw 32 is set down and work proceeds. The proper adjustment of the stops 24 is obtained by means of a depth micrometer through use of the holes 23 in end disc 21.

If when the work by tool 4a is done it is desired to use tool 4b and that work is to be stopped according to the setting of stop 24 in groove 18b, the set screw is released, the slide 18 is pulled to the right until the fixed stop 25 enters the groove 19, the slide is rotated until groove 18b comes to the top, whereupon the slide is moved to the left until the two stops abut, the set screw is turned down and the work proceeds with tool 4b. Similarly the slide is rotatively adjusted to bring the other grooves successively uppermost so as to receive the fixed stop and the stop disc 21 is accordingly positioned for work by the other tools on the desired portion of the work. The round end 20 fits into the holder and acts as a bearing during rotative adjustment of the grooved member.

Figures 4, 8:
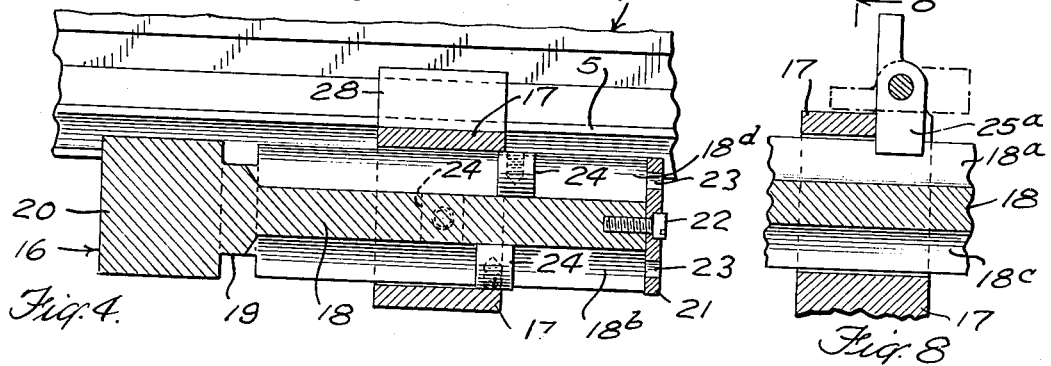
Fig. 4 is an enlarged sectional plan on line 4—4 of Fig. 2.
Fig. 8 is a transverse section on line 8—8 of Fig. 7.

In Figs. 7 and 8 there is shown a modified form of fixed stop. Instead of the immovable stop 25 which necessitates the groove 19, a pivoted stop 25a is shown. This is pivoted between a pair of ears on the top of the holder 17 and the holder is cut away to allow the stop to be raised and lowered by manipulation of an extension above the pivot. This pivoted stop in its operative position bears against the wall of the holder at the rear of the slot formed in it to permit rotative movement of the stop from the full line to the dotted line positions in Fig. 8. When in the dotted line position it permits the member 18 to be rotatively turned without interference.

By releasing the clamping screw 30 the holder 17 may be moved anywhere along the V-guide and may be located on the opposite side of the carriage with the slide 18 reversed.

It will be understood that the principle of the invention is not limited to the structural details shown in the drawings and above particularly described, which are illustrative only. Other ways to embody the invention defined in the following claims will readily occur to those skilled in the art.

What is claimed is:

1. Stop means for a carriage of a lathe having guide ways for the carriage comprising an anular holder, means for clamping the holder onto one of the guide ways in the path of the carriage apron, an elongated member rotatively and axially slidable in the holder, said member having a plurality of longitudinal grooves and a single carriage abutment surface adapted to contact the said carriage apron in all rotative positions of the elongated member, an adjustable stop settably secured in each groove, and an inwardly extending fixed stop secured to the holder and adapted to extend into each of the several grooves selectively and limit the axial movement of the elongated member in said holder by abutment with an adjustable stop.

2. Stop means as defined in claim 1 together with an end disc on the end of the elongated member toward the carriage having a hole therein in line with each groove.

3. Stop means as defined in claim 1 in which the elongated member has a circumferential groove near its end farthest from the carriage of a depth to receive the said fixed stop.

4. Stop means as defined in claim 1 together with means carried by the holder for securing the elongated member in adjusted position.

References Cited in the file of this patent

UNITED STATES PATENTS

| 767,592 | Orbison | Aug. 16, 1904 |
| 2,361,453 | Casella | Oct. 31, 1944 |

FOREIGN PATENTS

| 51,097 | Sweden | Apr. 7, 1920 |
| 854,941 | France | Apr. 27, 1940 |